US008136099B2

(12) United States Patent
Haller et al.

(10) Patent No.: US 8,136,099 B2
(45) Date of Patent: Mar. 13, 2012

(54) METHOD AND SYSTEM FOR AUTOMATICALLY GENERATING EXECUTABLE PROCESSES FROM INTER-ORGANIZATIONAL WORKFLOWS

(75) Inventors: Jochen Haller, Karlsruhe (DE); Ingo Weber, Karlsruhe (DE)

(73) Assignee: SAP AG, Walldorf (DE)

( * ) Notice: Subject to any disclaimer, the term of this patent is extended or adjusted under 35 U.S.C. 154(b) by 1375 days.

(21) Appl. No.: 11/286,531

(22) Filed: Nov. 22, 2005

(65) Prior Publication Data
US 2007/0118563 A1 May 24, 2007

(51) Int. Cl.
*G06F 9/44* (2006.01)
*G06Q 10/00* (2006.01)

(52) U.S. Cl. ........ 717/136; 717/102; 717/163; 717/164; 705/300; 705/301

(58) Field of Classification Search .................. 717/100, 717/101, 102, 103, 104, 105, 106, 107, 108; 707/100.1, 103; 705/1, 7, 8, 9; 709/201
See application file for complete search history.

(56) References Cited

U.S. PATENT DOCUMENTS

| | | | | | |
|---|---|---|---|---|---|
| 5,301,320 | A | * | 4/1994 | McAtee et al. | 705/9 |
| 5,535,322 | A | * | 7/1996 | Hecht | 705/1 |
| 5,734,837 | A | * | 3/1998 | Flores et al. | 705/7 |
| 5,870,545 | A | * | 2/1999 | Davis et al. | 709/201 |
| 5,930,512 | A | * | 7/1999 | Boden et al. | 717/102 |
| 5,937,388 | A | * | 8/1999 | Davis et al. | 705/8 |
| 6,052,684 | A | * | 4/2000 | Du | 707/8 |
| 6,067,548 | A | * | 5/2000 | Cheng | 707/103 R |
| 6,601,233 | B1 | * | 7/2003 | Underwood | 717/102 |
| 6,934,932 | B2 | * | 8/2005 | Dathathraya | 717/115 |
| 7,051,071 | B2 | * | 5/2006 | Stewart et al. | 709/204 |
| 7,133,833 | B1 | * | 11/2006 | Chone et al. | 705/7 |
| 7,149,734 | B2 | * | 12/2006 | Carlson et al. | 707/6 |
| 7,197,740 | B2 | * | 3/2007 | Beringer et al. | 717/108 |
| 7,272,816 | B2 | * | 9/2007 | Schulz et al. | 717/104 |
| 7,350,188 | B2 | * | 3/2008 | Schulz | 717/104 |
| 7,370,335 | B1 | * | 5/2008 | White et al. | 719/328 |
| 7,467,371 | B1 | * | 12/2008 | Meredith et al. | 717/104 |
| 7,653,562 | B2 | * | 1/2010 | Schulz et al. | 705/7.27 |
| 7,840,934 | B2 | * | 11/2010 | Sayal et al. | 717/102 |
| 7,853,933 | B2 | * | 12/2010 | Coker et al. | 717/136 |
| 2002/0038450 | A1 | * | 3/2002 | Kloppmann et al. | 717/102 |
| 2003/0018510 | A1 | * | 1/2003 | Sanches | 705/9 |
| 2003/0046282 | A1 | * | 3/2003 | Carlson et al. | 707/6 |
| 2003/0083923 | A1 | * | 5/2003 | Guicciardi et al. | 705/9 |

(Continued)

OTHER PUBLICATIONS

"Business-to-business interactions: issues and enabling technologies", Brahim Medjahed, [Online], Jan. 6, 2006, pp. 1-27, [Retrieved on Oct. 31, 2011], [Retrieved from Internet], <http://delivery.acm.org/10.1145/780000/775457/30120059.pdf>.*

(Continued)

*Primary Examiner* — Thuy Dao
*Assistant Examiner* — Ziaul A Chowdhury
(74) *Attorney, Agent, or Firm* — Blakely Sokoloff Taylor & Zafman, LLP

(57) ABSTRACT

A method and system to automatically translate a definition of a choreography workflow process to an executable process are provided. The method includes processing a collaboration element from the definition, mapping the collaboration element to an executable element based on a knowledge database system that contains the collaboration element and the corresponding executable element and mapping the collaboration element to the executable element statically if the corresponding executable element is unavailable in the knowledge database system.

8 Claims, 3 Drawing Sheets

U.S. PATENT DOCUMENTS

| | | | | |
|---|---|---|---|---|
| 2003/0172368 A1* | 9/2003 | Alumbaugh et al. | ......... | 717/106 |
| 2003/0200527 A1* | 10/2003 | Lynn et al. | ................... | 717/102 |
| 2004/0015818 A1* | 1/2004 | McDonald et al. | ........... | 717/102 |
| 2004/0083448 A1* | 4/2004 | Schulz et al. | ................. | 717/101 |
| 2004/0187089 A1* | 9/2004 | Schulz | ......................... | 717/101 |
| 2006/0095276 A1* | 5/2006 | Axelrod et al. | .................. | 705/1 |

OTHER PUBLICATIONS

"Intelligent Database for the SOA using BPEL" Aarti M Karande et al., [Online], Feb. 2011, pp. 281-284, [Retrieved on Oct. 31, 2011], [Retrieved from Internet], <http://delivery.acm.org/10.1145/1950000/1948000/p281-karande.pdf>.*

"Workflow Technologies for a Virtual ISP", Klaus Peter Eckert et al. [Online], 2006, pp. 1-8, [Retrieved on Oct. 31, 2011], [Retrieved from Internet], <http://www.visp-project.org/docs/publications/Workflow_Technologies_for_a_Virtual_ISP.pdf>.*

"Choreography in an Order Management Scenario", Olaf Zimmermann et al, [Online], Oct. 16-20, 2005, pp. 301-312, [Retrieved on Oct. 31, 2011], [Retrieved from Interneet], <http://delivery.acm.org/10.1145/1100000/1094965/p301-zimmermann.pdf>.*

Final Office Action for U.S. Appl. No. 11/356,531 Mailed Jul. 8, 2010, 16 Pages.

* cited by examiner

METHOD AND SYSTEM FOR AUTOMATICALLY GENERATING EXECUTABLE PROCESSES FROM INTER-ORGANIZATIONAL WORKFLOWS

FIELD OF THE INVENTION

An embodiment relates generally to the field of online collaboration. More particularly, an embodiment relates to a method and a system for automatically generating executable processes from inter-organizational workflows.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects and offer services that could not be provided by individual organizations.

A growing array of technologies has emerged to help bridge the gaps between people, time and geography in such collaborative environments. This includes the development of Web Services Choreography Description Language (WS-CDL) which is an XML-based language that describes peer-to-peer collaboration of participants by defining, from a global viewpoint, their common and complementary observable behavior, where messages are exchanged to accomplish a common operational goal. In particular, WS-CDL is targeted at composing interoperable, collaboration between any type of participants regardless of the supporting platform, programming model and security domain of the hosting environment.

Stated differently, WS-CDL describes the externally observable behavior of a business entity in an inter-organizational workflow process. WS-CDL provides a means to define the rules or protocols of collaboration between multiple participants from different security domains without revealing the internal operation. In general, WS-CDL specifies the participants, the type of information being exchange during the interaction of the participants and the options available to continue the interaction.

In addition, WS-CDL is frequently used in conjunction with the Web Services Business Process Execution Language (WS-BPEL). WS-BPEL is a programming language designed to allow collaborative execution of activities and service orchestration e programming by different groups of people. The emphasis of WS-BPEL is partitioning workflow processes into WS-BPEL process stubs with specific interaction between the WS-BPEL process stubs. One approach of deriving WS-BPEL for a workflow process is for multiple participants to agree on a specific choreography defined in WS-CDL in order to achieve a common goal. The WS-CDL is then used to generate WS-BPEL process for each participant. Stated differently, the WS-CDL choreography is similar to a global contract to which all the participants are committed while the WS-BPEL are the steps required to execute the global contract.

However, WS-CDL suffers from insufficient separation of meta-model and syntax, has limited support for certain use case categories and the format grounding is not comprehensible. Beyond that, it is unclear whether all WS-CDL concepts can be mapped to WS-BPEL without active human intervention. Improvements in the automatic generation of executable processes (WS-BPEL) from inter-organizational workflows (WS-CDL) are certainly needed.

SUMMARY OF THE INVENTION

According to one aspect of the invention, there is provided a method to automatically translate a collaboration definition of a workflow process to an executable program. The method includes processing a collaboration element from the collaboration definition, mapping the collaboration element to one or more executable elements based on a knowledge database system that contains the collaboration element and the corresponding executable elements and mapping the collaboration element to the executable elements statically if the corresponding executable element is unavailable in the knowledge database system.

According to a further aspect of the present invention, there is provided a system for automatically translating a collaboration definition of a collaborative workflow process to an executable program. The system includes a conversion engine for mapping a collaboration element from the collaboration definition to an executable element and a knowledge database system containing the collaboration element and the corresponding executable element. The conversion engine further contains an automatic mapping module and a static mapping module.

Other features of the invention will be apparent from the accompanying drawings and from the detailed description that follows.

DESCRIPTION OF THE DRAWINGS

An embodiment of the present invention is illustrated by way of example and not limitation in the figures of the accompanying drawings, in which like references indicate similar elements and in which.

DETAILED DESCRIPTION

A method and system for automatically translating inter-organizational workflows to executable processes with a knowledge-based system. In the following description, for purposes of explanation, numerous specific details are set forth in order to provide a thorough understanding of an embodiment of the present invention. It will be evident, however, to one skilled in the art that the present invention may be practiced without these specific details.

As organizations embrace online collaborative environment, the exchange of structured information between multiple organizations becomes a crucial means to facilitate coordinated production of goods and services. The principal motivation behind WS-CDL and WS-BPEL is to ensure interoperability among multiple organizations or individuals.

WS-CDL is an unambiguous, high-level way of describing the relationships between the services in a cross-domain, peer-to-peer or centralized collaboration. In one aspect, WS-CDL represents the high-level description of the choreography without the internal operations of the participants of the workflow process. The internal operations or detailed workflow process of each of the participants is provided by WS-BPEL. In one example of a purchasing workflow process, WS-CDL provides, at a high level, the exchange of messages or processes that occur to purchase a product. WS-CDL describes the inter-organizational relationship without taking the perspective of a buyer, a seller or a shipper. On the other hand, WS-BPEL deals with the view on private and public executable processes of one participant. Stated differently, WS-CDL provides a description that can be used to generate the behavior of the participants. However, the execution of the behavior of each participant is via WS-BPEL.

Figure 1:
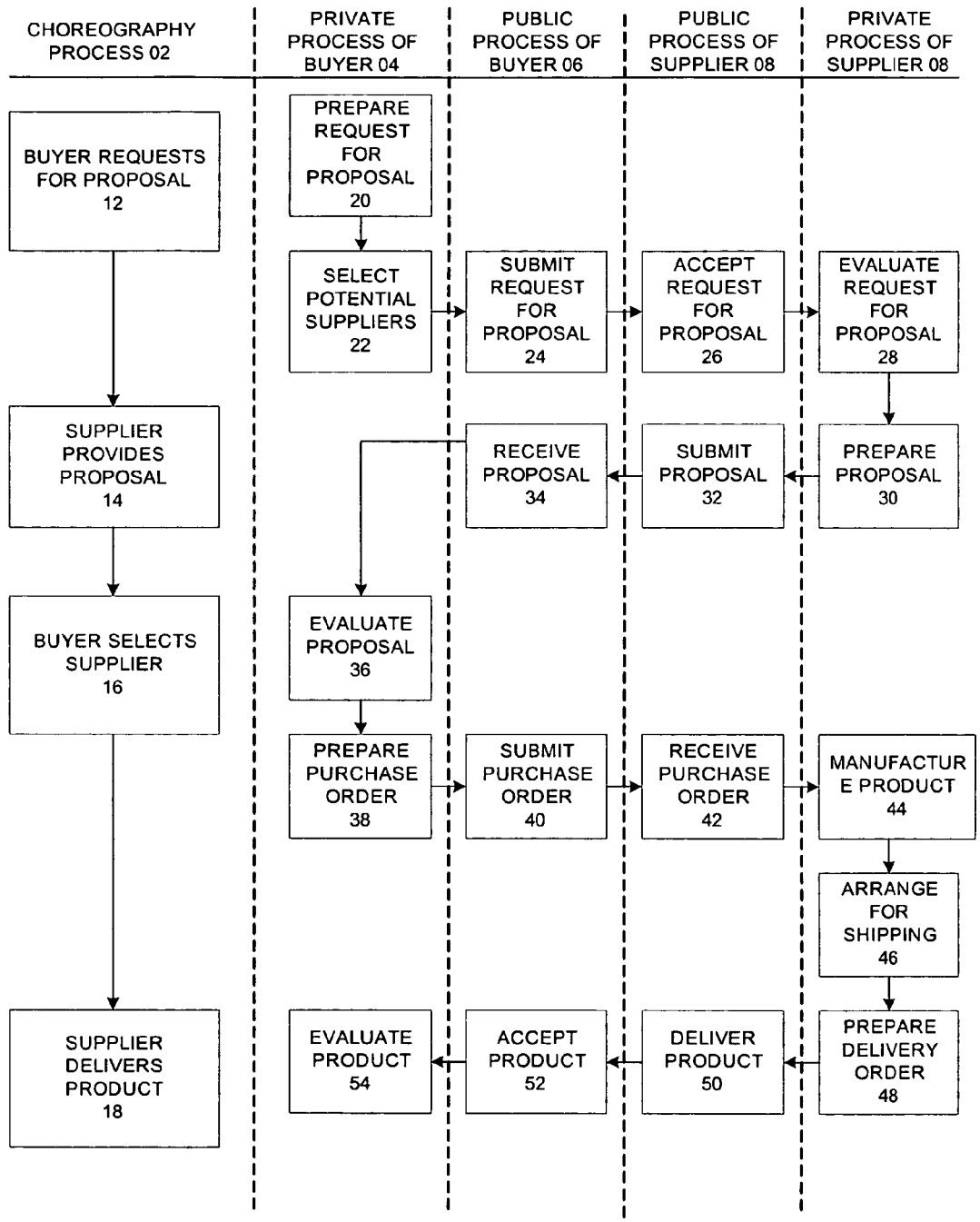
FIG. 1 is an interactive flow diagram illustrating the choreography and the partner role specific executable processes for a business transaction in accordance with one exemplary embodiment of the invention.

FIG. 1 is an interactive flow diagram illustrating the choreography process and the executable processes for a business transaction in accordance with one exemplary embodiment of the invention. The collaborative process 02 begins with the buyer requesting a proposal (block 12). In response, the supplier provides a proposal to the buyer (block 14). The buyer accepts the proposal of the supplier (block 16) and receives the product when the supplier delivers the product (block 18). The collaborative process 02 is a choreography process defining the interaction between the buyer and the supplier. It will be noted that the collaborative process 02 provides a high-level global description of the roles of the participants, the activities and the interaction between the activities. The roles of the participants relate to the required profession of a participant in order for the participant to take part in the collaboration. The activities are described in a coarse grained fashion for each role required in the collaboration. The interaction captures the collaborative aspect of the activities, essentially the messages and elements exchanged among the participants.

The executable processes which are derived or mapped from the collaborative process 02 include the private process (04) and public process (06) of the buyer, and the private process (10) and the public process (08) of the supplier. As illustrated, the private and public processes (04, 06, 08 and 10) disclose the detailed processes that need to take place in order to complete the collaborative process 02 as defined earlier. Private process usually refers to a highly optimized internal process which if known to a third party will leave the disclosing party in a disadvantage. Frequently, a private process is not accessible or viewable by external participants. On the other hand, public process does not compromise the confidentiality of the participant who is disclosing the information. In some cases, the public process serves as an interface of a workflow process for exchanging requests and responds among participants.

The executable processes (blocks 20 to 24) corresponding to the choreography process (block 12) begin at block 20, wherein the buyer prepares a request for the proposal (RFQ) which includes product information and the terms and conditions of the transaction. It will be noted that block 20 is private to the buyer as the process is confidential to the buyer. Next, the buyer decides the potential suppliers to invite to work on the RFQ (block 22). The buyer then submits the RFQ to the potential suppliers (block 24). Block 24 is a public process which enables the buyer and the supplier to exchange information, i.e. the RFQ.

The next choreography process (block 14) involves the supplier providing a proposal. In the corresponding executable process (blocks 26 to 32), the supplier accepts the RFQ (block 26) and evaluates the RFQ (block 28). After evaluating the RFQ, the supplier prepares a response (block 30) and submits the response to the buyer (block 32).

In response, the buyer accepts the proposal (block 34) and evaluates the proposal (block 38). The buyer prepares the purchase order (block 38) and submits the purchase order to the selected supplier (block 40). These executable processes of the buyer (blocks 34-40) correspond to the choreography process of selecting the supplier (block 16).

In this example, the supplier is obligated to deliver the product (collaborative process 18) once he accepts the purchase order (block 42). The supplier manufactures the product (block 44) and arranges for shipping (block 46). It will be noted that the process for shipping the product may involve another participant, such as a shipping company (not illustrated). Therefore, the executable process may be further expanded to define a subset of executable processes between the supplier and the shipping company.

The supplier prepares a delivery order (block 48) and delivers the product to the buyer (block 50). The choreography process 02 is completed when the buyer receives the product (block 52) and accepts the product (block 54) after an evaluation.

Figure 2:
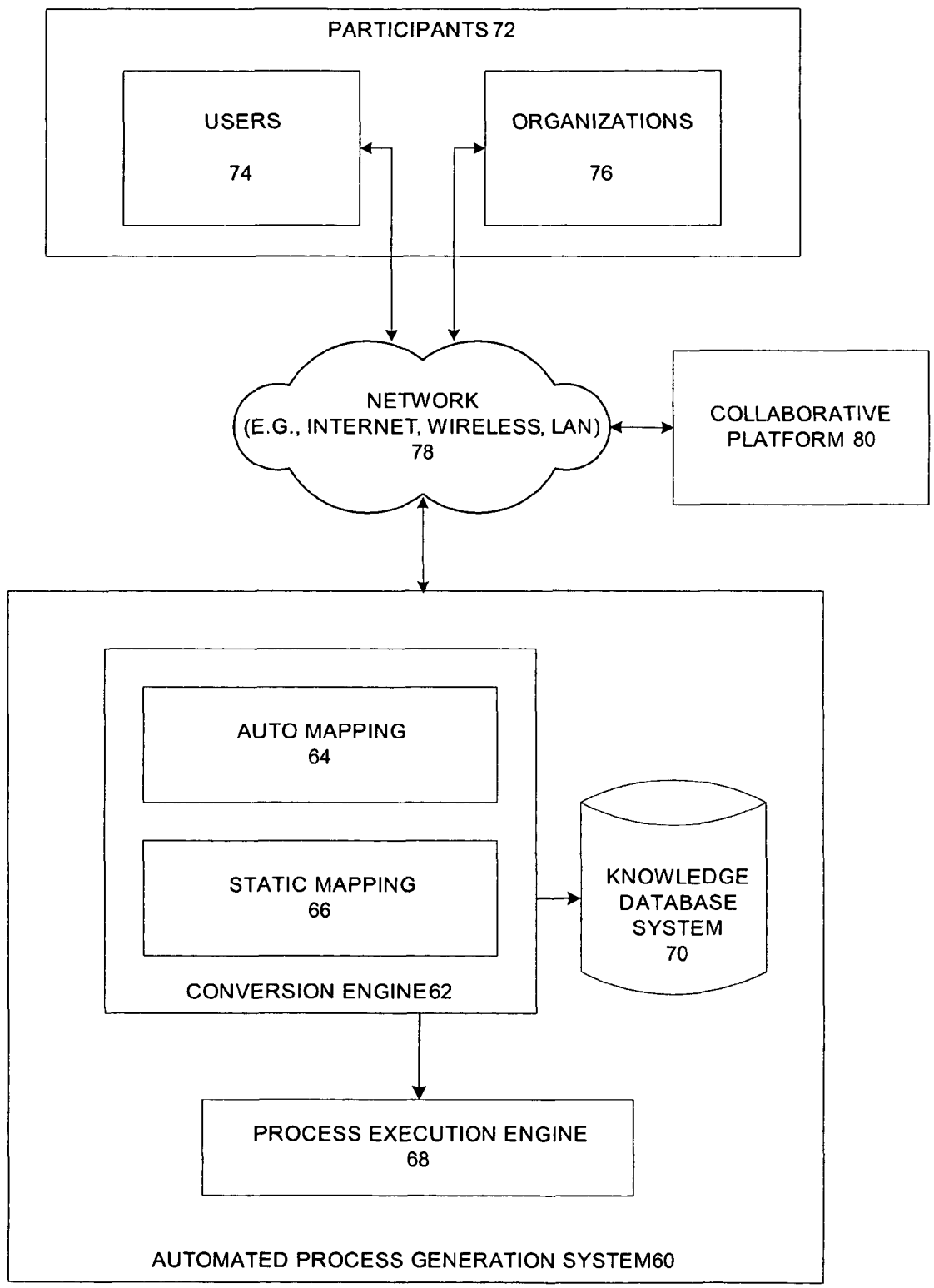
FIG. 2 is a network diagram depicting a system for automatically translating choreography process to executable process in accordance with one exemplary embodiment of the invention.

FIG. 2 is a network diagram depicting a system for automatically translating choreography process to executable process in accordance with one exemplary embodiment of the invention. An automated process generation system 60 is connected to a collaborative platform 80 via a network 78 (e.g. Internet, wireless and LAN). The collaborative platform 80 is a system for supporting the administration and execution of workflow processes of virtual organizations formed by multiple participants 72 (such as users 74 and organizations 76). The participants 72 may be from different security domains.

In one embodiment of the invention, the participants 72 design the choreography processes on the collaborative platform 80. The collaborative platform 80 provides choreography processes of the virtual organizations to the automated process generation system 60. In response, the automated process generation system 60 derives the corresponding executable processes from the choreography processes.

In one embodiment of the invention, the automated process generation system 60 includes a conversion engine 62 for converting choreography process to executable process, such as private and public processes. Stated differently, the conversion engine 62 translates choreography description language (e.g., WS-CDL) to executable process language (e.g., WS-BPEL).

There are two main process mapping modules in the conversion engine 62. The auto-mapping module 64 operates to systematically map choreography description language to executable process language. This is achieved by leveraging a knowledge database system 70 which contains a library or dictionary specifying the schema and syntax of the choreography description language and the corresponding executable process language. When the conversion engine 62 receives a program or document in choreography description language, the auto-mapping module 64 maps the choreography description language to executable process language based on the schema and syntax of the languages stored in the knowledge database system 70.

Alternatively, the knowledge database system 70 may be further divided into a first database that contains commonly known translations and a second database that includes specialized translations. Stated differently, the first database supports translation in a one-to-one fashion from choreography description language to executable process language which is commonly used. The second database is more knowledge-based oriented where methods and techniques of artificial intelligence may be involved, such as inference mechanisms and pattern-recognition search.

The knowledge database system 70 has to be maintained and updated with content described in the choreography description language and the corresponding executable process language. In one embodiment of the invention, the participants 72 update the knowledge database system 70 with parts of the choreography process and the corresponding public and private processes. The participants 72 may submit to the knowledge database system 70 a file containing the syntax of the corresponding executable description language part. In addition, modeling tools, such as Unified Modeling Language, may be used to generate the executable description language from the choreography description language. The translations are further provided to the knowledge database system 70 such that automatic mapping can be provided during the collaboration process. It will be noted that the translation provided by such modeling tools may require additional processing by the participants 72. For example, the modeling tools may only provide a skeleton code of the executable description language. Therefore, the participants 72 may need to further define the skeleton code.

Referring to the example as illustrated in FIG. 1, the knowledge database system 70 needs to contain the corresponding executable process parts (blocks 34 to 40) of the choreography process part of supplier selection (block 16) in order to perform the translation. In one embodiment, the buyer may update the knowledge database system of the public processes (blocks 34 and 40) and the private processes (blocks 34 and 38). In another embodiment, the knowledge database system 70 may only require the buyer to provide information relating to the private processes (blocks 34 and 38). For example, the knowledge database system 70 may contain information specifying that a selection process in general will require a translation to a corresponding executable process parts for receiving and replying activities. Therefore, the knowledge database system 70 generates the public process parts (blocks 34 and 40) automatically. In a further example, the knowledge database system 70 may even generate a skeleton code for the private process parts (blocks 34 and 38). However, the skeleton code may require further specification from the buyer, such as who is to assume the evaluator (block 34) and what type of paper work to prepare (block 38).

In one embodiment of the invention, the knowledge database system 70 is designed to be a "learning" system. Stated different, the knowledge database system 70 is able to fine tune and improve the mapping of choreography description language to executable process language. Referring to the example described above, the knowledge database system 70 may learn the private processes (block 34 and 40) corresponding to the choreography process (block 16) of the particular buyer. In future instances of the selection process (block 16), the knowledge database system may provide the translation without any further input from the buyer, hence, achieving a fully automated system.

However, there may be cases where the schema and syntax of the choreography description language are not represented in executable process language. For example, the private process of the participants may be highly customized and not easily associated with a generic choreography process. In such cases, the conversion engine 62 deploys the static-mapping module 66 whereby the participants 72, in particular, a programmer or an administrator manually translates the executable process language from the choreography description language.

Similarly, in such events where the auto-mapping module 64 fails to perform the translation and required static mapping, the knowledge database system 70 is updated with the translation provided by the static mapping module 66. That is, the knowledge database system 70 "learns" from situations where static mapping is required. Therefore, the conversion engine 62 is able to minimize static mapping and achieve a highly automated system for generating executable process language from choreography description language.

The conversion engine 62 provides a process execution engine 68 with the executable process language derived from the choreography description language. The process execution engine 68 processes the executable language to perform the private and public processes corresponding to the choreography process. An example of one such conversion engine 68 which is an embodiment of the present invention, is included in an Appendix hereto incorporated by reference.

While FIG. 2 shows the systems (80 and 60) located at different network segments, the systems (80 and 60) may be combined into a single system or the systems (80 and 60) may be divided into multiple systems. Similarly, the various components (62, 64, 66, 68 and 70) of the automated process generation system 60 may be further divided into multiple systems. For example, the knowledge database system 70 may be designed as an independent stand alone system.

Figure 3:
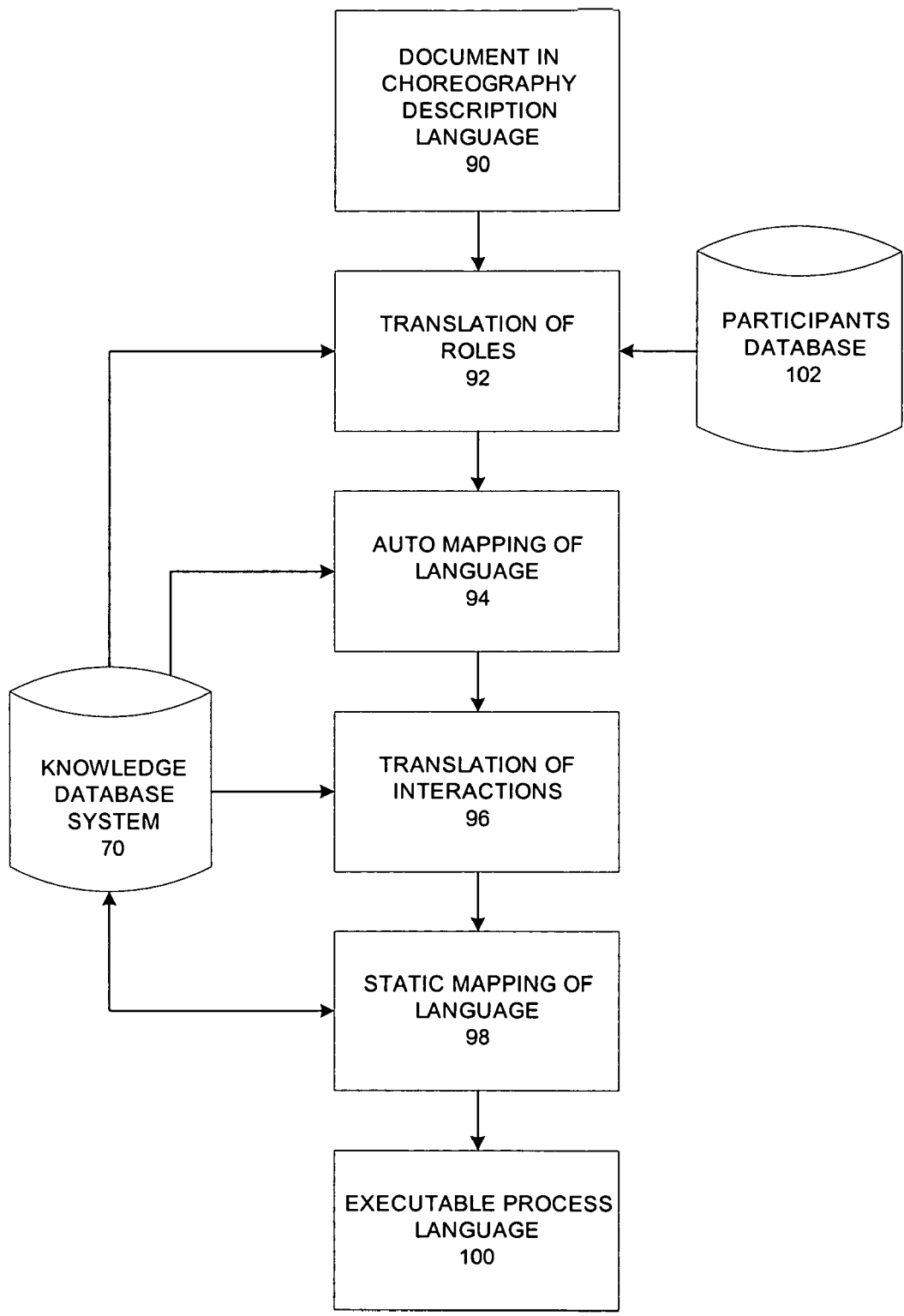
FIG. 3 is a flowchart illustrating a method to translate choreography process to executable process in accordance with one exemplary embodiment of the invention.

FIG. 3 is a flowchart illustrating a method for translating inter-organizational workflow process to an executable process in accordance with one exemplary embodiment of the invention. The method begins at block 90 wherein a document in choreography description language is provided and the translation of choreography description language to executable process language is invoked. As described earlier, the choreography description language provides a high level overview of the workflow process, specifying the rules of the collaboration between multiple participants without revealing internal operations of the participants. In one example, the choreography description language specifies the roles of the participants, when information is sent to which participants and which options are available to continue the interaction.

The translation of choreography description language to executable process language requires the roles of the participants to be associated with actual participants (block 92). That is, participants are selected and identified to fulfill the roles as specified in the choreography description language. In one embodiment, the selection of the participants is based on a participant database 102 and/or the knowledge database system 70 as described earlier. The participant database 102 and the knowledge database system 70 are designed to contain credential and identity information relating to the participants. This enables the translation of roles (block 92) to search the participant database 102 or the knowledge database system 70 to identify the participants that best match the roles as described in choreography description language.

The translation process next performs an automatic mapping of choreography description language to executable process language (block 94). Executable process language is systematically derived from the choreography description language. In one embodiment of the invention, the knowledge database system 70 provides the schema and syntax of the corresponding executable process language. Alternatively, as described above, the knowledge database system 70 may contained a first database containing translation for common choreography description language and a second database with capability to translates complex choreography description language (not illustrated).

In addition, the interaction of the participants defined in the choreography description language is further translated (block 96). In one example, the translation (block 96) includes specifying the information or elements to be exchanged between participants, the logic flow of the interaction and the relationships of the participants. It will be noted that the knowledge database system 70 may contain historic or pre-defined information relating to such interaction. Therefore, the translation (block 96) may leverage the knowledge database system 70 to automate the translation. For example, the knowledge database system 70 may specify that for a choreography process of accepting a delivery from a supplier, the related interaction includes the interactive steps of (1) receiving a delivery order from the supplier, (2) evaluating that the supplier has a valid purchase order issued by the buyer, (3) evaluating the product against the purchase order and (3) signing off on the delivery order.

In the event that the choreography language cannot be automatically translated to executable processes, static translation is then required where an administrator manually designs the corresponding executable processes (block 98). The translation may then be feedback to the knowledge database system 79. This enables future similar cases to be automatically translated.

The method for translating from inter-organization workflow to executable processes is completed at block 100 whereby the executable process language is fully translated from the choreography language.

Thus, a method and system for automatically translating inter-organizational workflows to executable process with a knowledge-based system are described. Although the present invention has been described with reference to specific exemplary embodiments, it will be evident that various modifications and changes may be made to these embodiments without departing from the broader spirit and scope of the invention. For example, other executable languages such as Java and C# may be applied instead. Accordingly, the specification and drawings are to be regarded in an illustrative rather than a restrictive sense.

APPENDIX:

EXAMPLE:

Conversion Engine for translating Executable Process Language from Choreography Language

---

```
Remark: Pattern0004:
<CdlPart>
  <silentAction roleType="StoragePartner">
    <description type="documentation">getRawDataFromDB
varRawDataAddr_Sto varRawData_Sto</description>
  </silentAction>
</CdlPart>
Remark: Substitutions for Pattern0004:
<BpPart roleType="StoragePartner">
  <variable messageType="{http://trustcom.cecka.sap.com/cdl2bpel/PrivStorage}getDataRequest"
    name="getDataRequest" />
  <variable messageType="{http://trustcom.cecka.sap.com/cdl2bpel/PrivStorage}getDataResponse"
    name="getDataResponse" />
  <sequence>
    <assign>
     <copy>
       <from>
         <getDataReqElem xmlns="http://trustcom.cecka.sap.com/cdl2bpel/PrivStorage">
           <content />
         </getDataReqElem>
       </from>
       <to part="getDataReqElem" variable="getDataRequest" />
     </copy>
     <copy>
       <from variable="varRawDataAddr_Sto" />
       <to part="getDataReqElem" variable="getDataRequest"
         query="/ns0:getDataReqElem/ns0:content" />
     </copy>
    </assign>
    <invoke inputVariable="getDataRequest" name="InvokeGetData"
operation="getData" outputVariable="getDataResponse"
       partnerLink="PrivateStoPL" portType="{http://trustcom.cecka.sap.com/cdl2bpel/PrivStorage}
PrivateStoragePT"/>
    <assign>
     <copy>
       <from part="getDataRespElem" variable="getDataResponse"
query="/ns0:getDataRespElem/ns0:content" />
         <to variable="varRawData_Sto" />
     </copy>
    </assign>
  </sequence>
</BpPart>
<ViewPart roleType="StoragePartner" viewId="WsdlIdSubPrivSto"
  namespace="http://trustcom.cecka.sap.com/cdl2bpel/PrivStorage"></ViewPart>
```

What is claimed is:

1. A computer-implemented method comprising:

receiving a collaboration definition of a workflow choreography process, the workflow choreography process to describe a process to be collaboratively executed via a plurality of network participants, the collaboration definition to include a plurality of collaboration elements, wherein each of the plurality of collaboration elements includes a high-level description of network participant roles, network participant interactions, and an activity of the workflow choreography process;

identifying network participants to execute each of the plurality of collaboration elements based, at least in part, on the high-level description of the respective collaboration element;

mapping each of the plurality of collaboration elements to a corresponding executable element included in a knowledge database system based, at least in part, on the network participant identified to execute the respective collaboration element, wherein the corresponding executable element comprises one of a public executable element and a private executable element, the private executable element to be further mapped to an additional executable element included in the respective network participant; and generating a network participant-specific executable definition for each of the plurality of executable elements, the network participant-specific executable definition expressed in a machine executable language and to identify input and output dependencies of the network participant;

wherein the workflow choreography process is expressed in Web Services Choreography Description Language (WS-CDL); and the participant-specific executable definition for each of the plurality of executable elements is expressed in Web Services Business Process Execution Language (WS-BPEL).

2. The method of claim 1, wherein mapping each of the plurality of collaboration elements to the corresponding executable element comprises identifying network participants to map to the network participant roles as specified in each of the plurality of collaboration elements based, at least in part, on credential information relating to the participants.

3. The method of claim 1, wherein the high-level description of each of the plurality of collaboration elements further includes a high-level description of the types of information being exchanged among network participants, the logic flow of the information being exchanged, and the relationships between the network participants.

4. The method of claim 1, wherein a network participant-specific executable definition for a public executable element comprises an interface to exchange requests and responses with other network participants.

5. A system comprising:
a processor;
a memory;
a knowledge database system containing a plurality of executable elements, each executable element corresponding to a collaboration element; and
a conversion engine stored in the memory and executed via the processor to receive a collaboration definition of a workflow choreography process, the workflow choreography process to describe a process to be collaboratively executed via a plurality of network participants, the collaboration definition to include a plurality of collaboration elements, wherein each of the plurality of collaboration elements includes a high-level description of network participant roles, network participant interactions, and an activity of the workflow choreography process, identify network participants to execute each of the plurality of collaboration elements based, at least in part, on the high-level description of the respective collaboration element, map each of a plurality of collaboration elements to the corresponding executable element included in the knowledge database system based, at least in part, on the network participant identified to execute the respective collaboration element, wherein the corresponding executable element comprises one of a public executable element and a private executable element, the private executable element to be further mapped to an additional executable element included in the respective network participant; and generate a network participant-specific executable definition for each of the plurality of executable elements, the network participant-specific executable definition expressed in a machine executable language and to identify input and output dependencies of the network participant;

wherein the workflow choreography process is expressed in Web Services Choreography Description Language (WS-CDL); and the participant-specific executable definition for each of the plurality of executable elements is expressed in Web Services Business Process Execution Language (WS-BPEL).

6. The system of claim 5, wherein mapping each of the plurality of collaboration elements to the corresponding executable element comprises identifying network participants to map to the network participant roles as specified in each of the plurality of collaboration elements based, at least in part, on credential information relating to the participants.

7. The system of claim 5, wherein the high-level description of each of the plurality of collaboration elements further includes a high-level description of the types of information being exchanged among network participants, the logic flow of the information being exchanged, and the relationships between the network participants.

8. The system of claim 5, wherein a network participant-specific executable definition for a public executable element comprises an interface to exchange requests and responses with other network participants.

* * * * *